United States Patent [19]

France

[11] Patent Number: 5,172,423
[45] Date of Patent: Dec. 15, 1992

[54] METHODS AND APPARATUS FOR DEFINING CONTOURS IN COLORED IMAGES

[75] Inventor: Alexander D. France, Bedfordshire, England

[73] Assignee: Crosfield Electronics Ltd., England

[21] Appl. No.: 757,800

[22] Filed: Sep. 11, 1991

[30] Foreign Application Priority Data

Sep. 14, 1990 [GB] United Kingdom ............... 9020082

[51] Int. Cl.$^5$ ............................................. G06K 9/48
[52] U.S. Cl. ...................................... 382/22; 382/17; 382/54; 395/128
[58] Field of Search ................. 382/22, 54, 17, 9, 48; 358/262.1, 37; 364/521, 448; 395/128, 131

[56] References Cited

U.S. PATENT DOCUMENTS

| | | | |
|---|---|---|---|
| 4,183,013 | 1/1980 | Agrawala et al. | 382/22 |
| 4,189,711 | 2/1980 | Frank | 382/22 |
| 4,575,751 | 3/1986 | Duschl | 382/22 |
| 4,754,488 | 6/1988 | Lyke | 382/22 |
| 4,791,676 | 12/1988 | Flickner et al. | 382/22 |
| 4,805,127 | 2/1989 | Hata et al. | 364/521 |
| 4,856,074 | 8/1989 | Nagaoka | 382/9 |
| 5,093,869 | 3/1992 | Alves et al. | 382/22 |

FOREIGN PATENT DOCUMENTS 0323168 7/1989 European Pat. Off. .
2640452 6/1990 France .

OTHER PUBLICATIONS

"Faster Plots By Fan Data-Compression", R. A. Fowell et al., IEEE Computer Graphics & Applications, Mar. 1989, pp. 58-66.

"Automatic Outlining of Regions on CT Scans", J. M. Keller et al., Journal of Computer Assisted Tomography, vol. 5, No. 2, Apr. 1981, pp. 240-245.

*Primary Examiner*—Joseph Mancuso
*Attorney, Agent, or Firm*—Sughrue, Mion, Zinn, Macpeak & Seas

[57] ABSTRACT

A method and apparatus for defining a contour in a colored image to separate a selected region having a selected color or colors from other regions when the color component content of each pixel of the image is defined by digital data at a first resolution. The method comprises defining a region of the image containing colors which are to be located in the selected region and for each of the pixels in the defined region deriving a digital color component representation at a second resolution higher than the first resolution by combining color component data from one or more adjacent pixels. Each digital color component representation at a second resolution is then designated as a selected color value. An edge following algorithm is performed to define a contour within the image by deriving a digital color component representation at a second resolution for each pizel under consideration, as before, determining whether each digital color component representation is a selected color value and designating a pixel as lying on the contour by reference to the arrangement of neighboring pixels having selected color values.

9 Claims, 2 Drawing Sheets

METHODS AND APPARATUS FOR DEFINING CONTOURS IN COLORED IMAGES

FIELD OF THE INVENTION

The invention relates to methods and apparatus for defining a contour in a coloured image to separate a selected region having a selected colour or colours from other regions.

DESCRIPTION OF THE PRIOR ART

In electronic image processing, there is a common requirement to be able to isolate a particular region of an image. This may be, for example, to cut out the isolated section and replace it with another image portion, perform a colour modification within the region but not outside the region and the like. Various methods have been proposed to achieve this. One method is to use a masking technique and various colour selective masks have been used in the past. Another technique involves the generation of a contour or edge pixel by pixel which circumscribes the selected region. An example of a known contouring technique is described in "Automatic Outlining of Regions on CT Scans" by J M Keller et al, Journal of Computer Assisted Tomography, vol 5, No. 2, 1981, pages 240-245. As is described in this paper, a contouring or edge following technique is divided into three sections. First, an algorithm is needed to enable those pixels which are to be selected to be distinguished from those which are not. Secondly, a method must be provided to determine the seed or start point of the contour and thirdly an algorithm must be provided to enable the next outline point to be located given an initial point.

In conventional digital image processing, the colour component content of each pixel is commonly defined by three or four colour components each being represented by eight bit digital data. Consequently, each pixel is defined by 24 or 32 bit data. This volume of data is not well suited for performing a contouring technique since the number of possible colours of each pixel is so large that a considerable time would be required to enable each successive pixel in the contour to be determined.

In U.S. Pat. No. 4,805,127 an image describing apparatus is detailed which is capable of determining the boundary of an image area using an edge following algorithm. The image data is inputted into a CPU with each picture element of the image represented by 8 bits denoting a grey level. The CPU encodes each picture element by a single bit value, using two predetermined threshold values to separate the picture elements into three sets representing two different colour units such that one colour unit is represented by a "1" and the other by a "0".

EP 0323168 describes a colour correction system in which the picture element of the target objects are divided into digital components of hue saturation and luminance. The ranges of the values for these components are determined and extended a predetermined amount to define a target region of colour space against which picture elements within a selected area of an image can be compared to determine whether they fall within the component ranges.

In both the above cases, image data is divided into ranges of values for case of handling at the expense of accuracy.

SUMMARY OF THE INVENTION

In accordance with one aspect of the present invention, a method of defining a contour in a coloured image to separate a selected region having a selected colour or colours from other regions wherein a colour component content of each pixel of said coloured image is defined by digital data at a first resolution comprises a) Defining at least one region of said coloured image containing colours which are to be located in said selected region;

b) For each of said pixels in said defined region(s) deriving a digital colour component representation at a second resolution higher than said first resolution by combining said colour component content of one or more adjacent pixels with said colour component content of said pixel;

c) Designating each of said digital colour component representations at said second resolution derived in step b as a "selected colour value"; and, d) Performing an edge following algorithm to define said contour within said coloured image including deriving said digital colour component representation at said second resolution for each of said pixels under consideration in the same manner as in step (b), determining whether each of said digital colour component representations at said second resolution is one of said selected colour values, and designating one of said pixels as lying on said contour by reference to the arrangement of neighbouring pixels having said selected colour values.

In accordance with a second aspect of the present invention, apparatus for defining a contour in a coloured image to separate a selected region having a selected colour or colours from other regions wherein a colour component content of each pixel of said coloured image is defined by digital data at a first resolution comprises a first store for storing the digital data at said first resolution; and processing means for a) Defining at least one region of said coloured image containing colours which are to be located in said selected region;

b) For each of said pixels in said defined region(s) deriving a digital colour component representation at a second resolution higher than said first resolution by combining said colour component content of one or more adjacent pixels with said colour content of said pixel;

c) Designating each of said digital colour component representations at a second resolution derived in step b as a "selected colour value"; and, d) Performing an edge following algorithm to define said contour within said coloured image including deriving said digital colour component representation at said second resolution for each of said pixels under consideration in the same manner as in step (b), determining whether each of said digital colour component representations at a second resolution is one of said selected colour values, and designating one of said pixels as lying on said contour by reference to the arrangement of neighbouring pixels having said selected colour values.

We have devised a new method of defining a contour which overcomes the problem of working on 24 or 32 bit data mentioned above. In particular, the method enables the data to be stored at the first resolution which could for example define all the data with 8 bits as is conventional when storing data for use in controlling a monitor. However, that 8 bit data is increased in resolution to for example 14 bits by combining colour component data from one or more adjacent pixels. The second resolution can, however, be chosen so that a relatively small look-up table can be provided which is addressed by each second resolution colour value and which stores one bit data defining whether or not the addressing colour value is a selected colour value.

Preferably, step b comprises summing individually the respective colour component values of the pixel in question with two adjacent pixels. In a conventional orthogonal, two dimensional array, the pixels may be chosen as the pixels lying above and below or to the left and right of the pixel in question. It is to be understood, however, that more than two pixels could be used with the result that the second resolution would be higher than with just two pixels.

Step d may be performed using any conventional edge following algorithm but modified to make use of the special form of selected colour value designation. For example, the technique for selecting the seed point and for determining the next pixel in the contour can be as described in the paper mentioned above.

In some cases, the method further comprises, following step d, designating a secondary contour constituted by pixels offset from the originally designated pixel by an appropriate amount. Effectively, the contour which is finally designated is shrunk or spread from its original position.

Preferably, the method further comprises reducing the number of pixels defining the contour by locating those pixels which lie on a straight line and replacing the definition of the contour by the pixels at the end of the straight line. This process is described in more detail in "Faster Plots by Fan Data-Compression" by R A Fowell et al, IEEE Computer Graphics and Applications, March 1989, pages 58–66.

The method may be implemented on conventional image processing equipment in which the processing means has been suitably programmed.

BRIEF DESCRIPTION OF THE DRAWINGS

An example of a method and apparatus according to the invention will now be described with reference to the accompanying drawings, in which.

DETAILED DESCRIPTION OF AN EMBODIMENT

Figure 1:
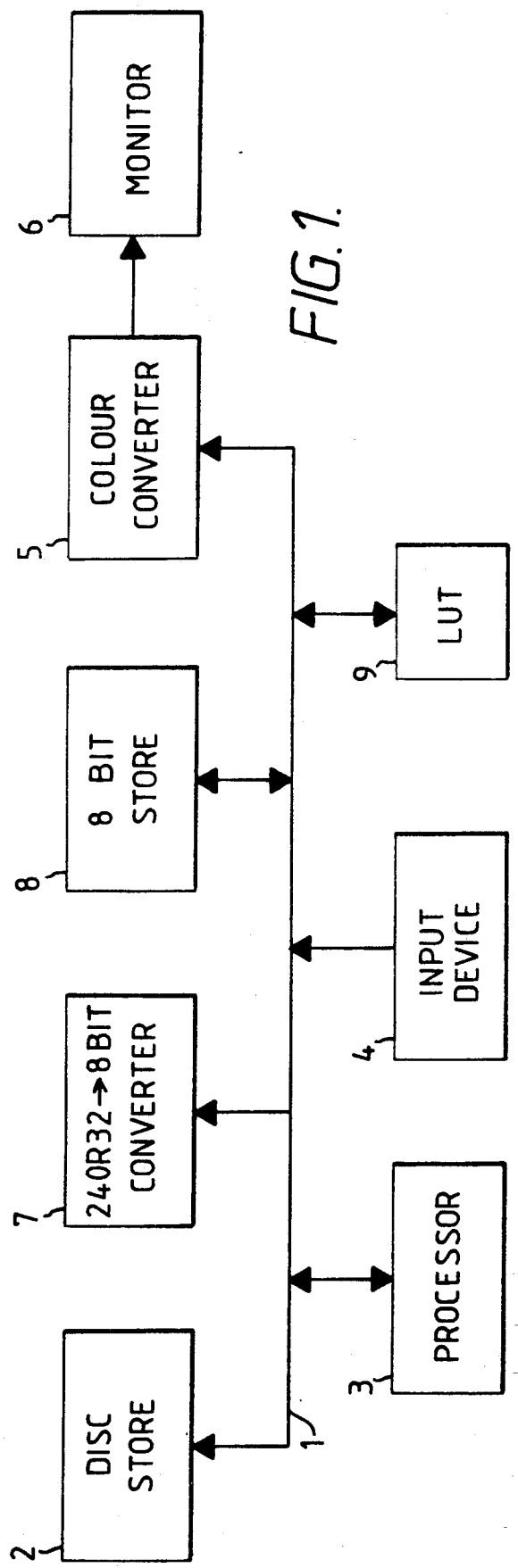
FIG. 1 is a block diagram of the apparatus.

The apparatus shown in FIG. 1 comprises a bus (1) coupled with a disc store (2) for storing a representation of an image, a processor (3), an input device (4) such as a keyboard or digitising table, a colour converter (5) for converting data representing cyan, magenta and yellow colour components to red, green and blue components, and a monitor (6) coupled with colour converter (5). A 24 or 32 to 8 bit converter (7) is also provided coupled with the bus (1) as is an 8 bit image store (8) and a look-up table (LUT) (9).

Figure 3:
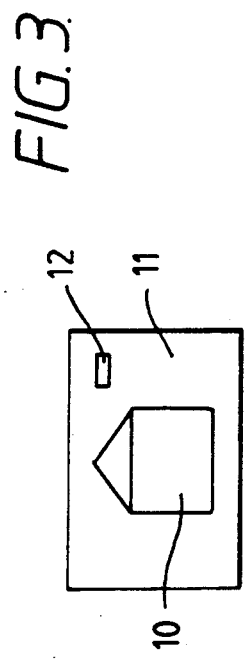
FIG. 3 illustrates a monitor display.

The disc store (2) holds digital data defining an image which may have been generated electronically or by scanning a transparency in a conventional manner. The disc store (2) holds, for each pixel, digital data defining the colour component content of that pixel. Thus, in one example, the store (2) holds 8 bit data defining the cyan, magenta and yellow colour component content of a pixel. In order to display the image stored in the disc store (2) on the monitor (6), the processor (3) is controlled by the operator via the input device (4) to generate for each pixel an 8 bit representation of the colour component data which is then stored in the store (8). Typically, this 8 bit representation is made up of 3 bits representing cyan, 3 bits representing magenta and 2 bits representing yellow. The image in the store (8) is then passed through the colour converter (5) and then displayed on the monitor (6). An example of an image is shown in FIG. 3. This image comprises a foreground portion (10) and a background portion (11).

Figure 2:
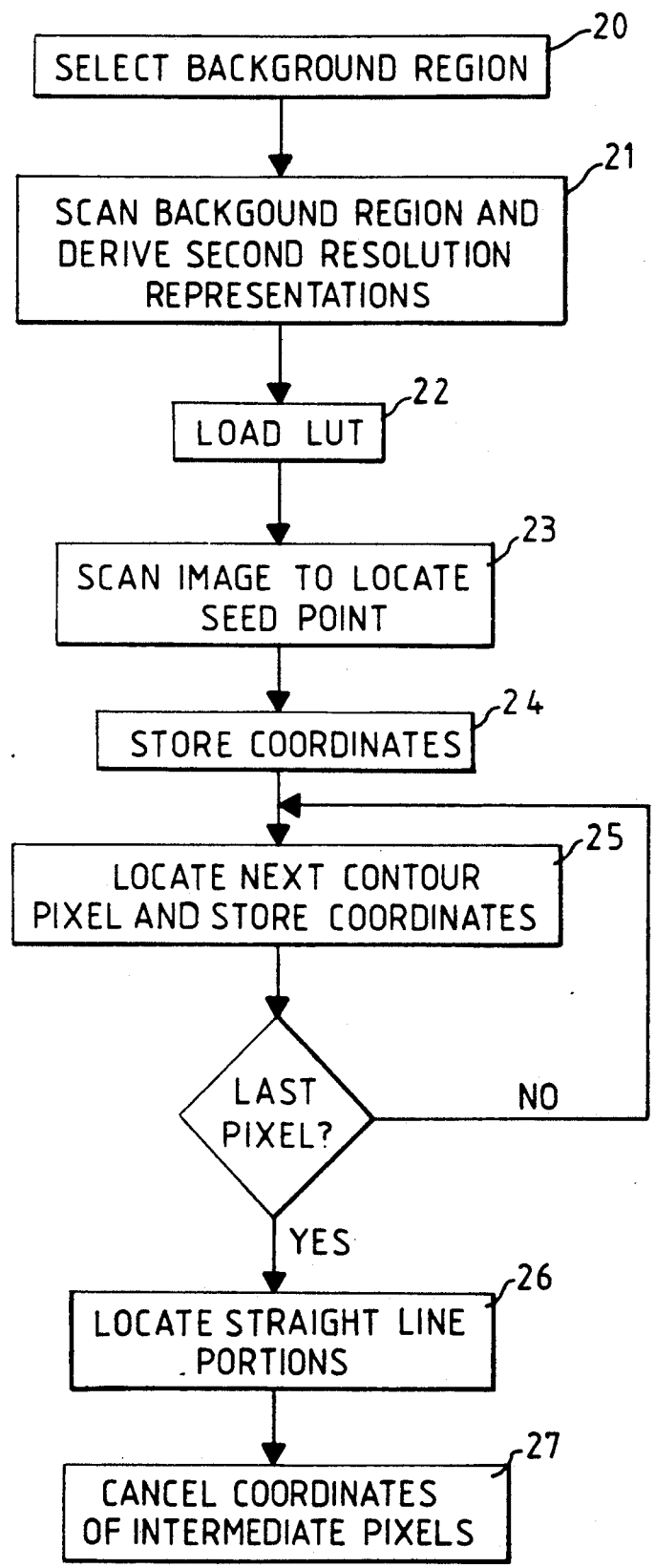
FIG. 2 is a flow diagram illustrating operation of the apparatus.

The invention is concerned with constructing a contour which, in this example, is intended to provide an outline around the foreground portion (10) of the image. A rectangular region (12) is displayed on the monitor (6) by the processor (3). The operator controls movement of this rectangular region (12) so as to locate it within a region which is to be defined as background colour as shown in FIG. 3 (step 20, FIG. 2).

The processor (3) then scans the pixels within the region (12) and for each pixel obtains the digital data defining the colour component content of the adjacent pixels in the left and right (horizontal) directions. The three data values are then summed for each colour component which would generate 5 bit values for the cyan and magenta colour components and a 14 bit value for the yellow colour component. (Step 21).

The LUT (9) has $2^{14}$ addresses corresponding to each possible colour value produced in step 21 and during the performance of step 21, the location addressed by each colour value is allocated a binary digit "1" (step 22). In this way, the processor (3) defines both colours which are to be allocated to the background region.

Following loading of the LUT (9), the processor (3) then switches to perform an edge following algorithm as generally described in the Keller et al paper mentioned above. Initially (step 23) it is necessary to locate the initial seed point from which the contour begins. In this example, location of the seed point is achieved using the method described in Keller et al, the text of which is incorporated herein by reference. The co-ordinates of the seed point are then stored in a contour store (not shown) in step 24.

The processor (3) then starts with the seed point and determines the next point along the contour again using a method as described in the Keller et al paper. The co-ordinates of the located pixel are then stored in the contour store (step 25). The co-ordinates of the last determined pixel in the contour are then compared with the first pixel and if they are different, processing returns to step 25. If they are the same, this indicates that the full contour has been located.

Typically, a contour will be constituted by a very large number of pixels. It is therefore preferable to reduce the number of co-ordinates stored by locating those portions of the contour which constitute straight lines (step 26) and then deleting the co-ordinates of those pixels in between the ends of each straight line (step 27). This is described in more detail in the Fowell et al paper mentioned above.

In an alternative application, instead of storing the co-ordinates of each point which is located, the co-ordinates of a pixel offset from the pixel in question could be located so that the contour is either shrunk or spread.

I claim:

1. A method of defining a contour in a coloured image to separate a selected region having a selected colour or colours from other regions wherein a colour component content of each pixel of said coloured image is defined by digital data at a first resolution, the method comprising
   a) Defining at least one region of said coloured image containing colours which are to be located in said selected region;
   b) For each of said pixels in said defined region(s) deriving a digital colour component representation at a second resolution higher than said first resolution by combining said colour component content of one or more adjacent pixels with said colour component content of said pixel;
   c) Designating each of said digital colour component representations at said second resolution derived in step b as a "selected colour value"; and,
   d) Performing an edge following algorithm to define said contour within said coloured image including deriving said digital colour component representation at said second resolution for each of said pixels under consideration in the same manner as in step (b), determining whether each of said digital colour component representations at said second resolution is one of said selected colour values, and designating one of said pixels as lying on said contour by reference to the arrangement of neighbouring pixels having said selected colour values.

2. A method according to claim 1, wherein said colour component content of each of said pixels at said first resolution is defined by 8-bit data.

3. A method according to claim 1, wherein said digital colour component representation at said second resolution is defined by 14-bit data.

4. A method according to claim 1, wherein step b comprises summing individually said colour component content of said pixel being processed in step b) with said colour component content of two of said adjacent pixels.

5. A method according to claim 4, wherein said pixels are defined in an orthogonal, two dimensional array, with said two of said adjacent pixels being chosen as the pixels lying above and below or to the left and right of said pixel being processed in step b).

6. A method according to claim 1, further comprising step d, designating a secondary contour constituted by pixels offset from said pixel originally designated by an appropriate amount.

7. A method according to claim 1, further comprising reducing a number of pixels defining said contour by locating pixels which lie on a straight line and replacing the definition of said contour by said pixels at the end of said straight line.

8. Apparatus for defining a contour in a coloured image to separate a selected region having a selected colour or colours from other regions wherein a colour component content of each pixel of said coloured image is defined by digital data at a first resolution, the apparatus comprising a first store for storing said digital data at said first resolution; and processing means for
   a) Defining at least one region of said coloured image containing colours which are to be located in said selected region;
   b) For each of said pixels in said defined region(s) deriving a digital colour component representation at a second resolution higher than said first resolution by combining said colour component content of one or more adjacent pixels with said colour content of said pixel;
   c) Designating each of said digital colour component representations at a second resolution derived in step b as a "selected colour value"; and,
   d) Performing an edge following algorithm to define said contour within said coloured image including deriving said digital colour component representation at said second resolution for each of said pixels under consideration in the same manner as in step (b), determining whether each of said digital colour component representations at a second resolution is one of said selected colour values, and designating one of said pixels as lying on said contour by reference to the arrangement of neighbouring pixels having said selected colour values.

9. Apparatus according to claim 8, further comprising a LUT having an address corresponding to each possible value of said digital colour component representation at said second resolution wherein each of said addresses stores data defining whether or not said digital colour component representation at said second resolution corresponding to said address is selected colour values and wherein said digital colour component representation at said second resolution one of said found in step b) is designated in said address of the LUT as said selected colour value.

* * * * *